Figure 1:
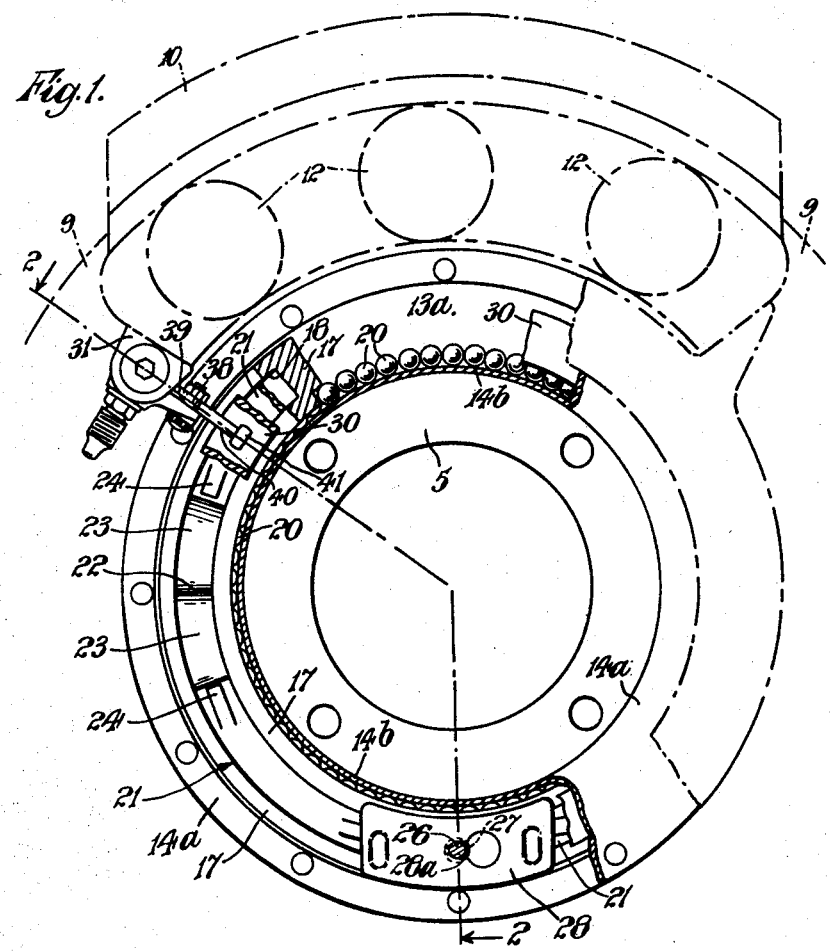

Nov. 22, 1960 — W. H. BENT — 2,961,275
VEHICLE WHEEL ANTI-SKID DEVICE
Filed April 30, 1957 — 2 Sheets-Sheet 1

Nov. 22, 1960 W. H. BENT 2,961,275
VEHICLE WHEEL ANTI-SKID DEVICE
Filed April 30, 1957 2 Sheets-Sheet 2

Inventor
William Harold Bent
by Benj. T. Rauber
his attorney

United States Patent Office 2,961,275
Patented Nov. 22, 1960

2,961,275

VEHICLE WHEEL ANTI-SKID DEVICE

William Harold Bent, Leicester, England, assignor to Dunlop Rubber Company Limited, a British company Filed Apr. 30, 1957, Ser. No. 656,066

Claims priority, application Great Britain May 9, 1956

6 Claims. (Cl. 303—24)

This invention relates to vehicle wheel anti-skid devices and more particularly relates to rotary inertia anti-skid devices for preventing skidding or sliding of motor-vehicle wheels which are provided with fluid-pressure operated brakes.

Rotary inertia anti-skid devices are known for aircraft having fluid-pressure operated wheel brakes and comprise a housing rotated by a landing wheel, a member rotatable within the housing and driven by the housing, a flywheel also rotatable within the housing and angularly movable relative to the member between predetermined limits and means operated by said angular movement for varying the fluid pressure to the wheel brakes in such a manner that slipping or sliding of the wheel is prevented. Such devices form the subject-matter of United States Patent to Trevaskis No. 2,656,017 of October 20, 1953.

The object of the present invention is to provide a device of this general type which is suitable for a motor-vehicle wheel and which will fit in the annular space available between the wheel hub and the rim.

According to the present invention a rotary inertia device for the control of fluid-pressure brakes comprises an annular rotatable housing, an annular flywheel enclosed by said housing and rotatable relative thereto, a cam-surface associated with said flywheel, a cam-follower associated with the housing and spring-urged into engagement with said cam-surface to normally maintain said flywheel and housing in a predetermined relative angular position, and means associated with said cam-follower and operated by relative angular movement from said predetermined position and against said spring means to regulate the flow of pressure to said brakes.

Preferably the annular housing is secured to and rotatable with a vehicle wheel and the annular flywheel is rotatable on bearings in said housing and is provided, on one radially-extending side, with a cam-surface comprising four angularly equi-spaced depressions with sloping sides, in each of which a cam-follower is located and is normally centrally maintained by spring means. Relative movement between said housing and flywheel, as by a sudden and hard application of the brakes, operates a slide valve to restrict the braking pressure. Preferably the brake is a disc brake of the type described in United States patent to Wright et al. No. 2,790,516.

Figure 2:
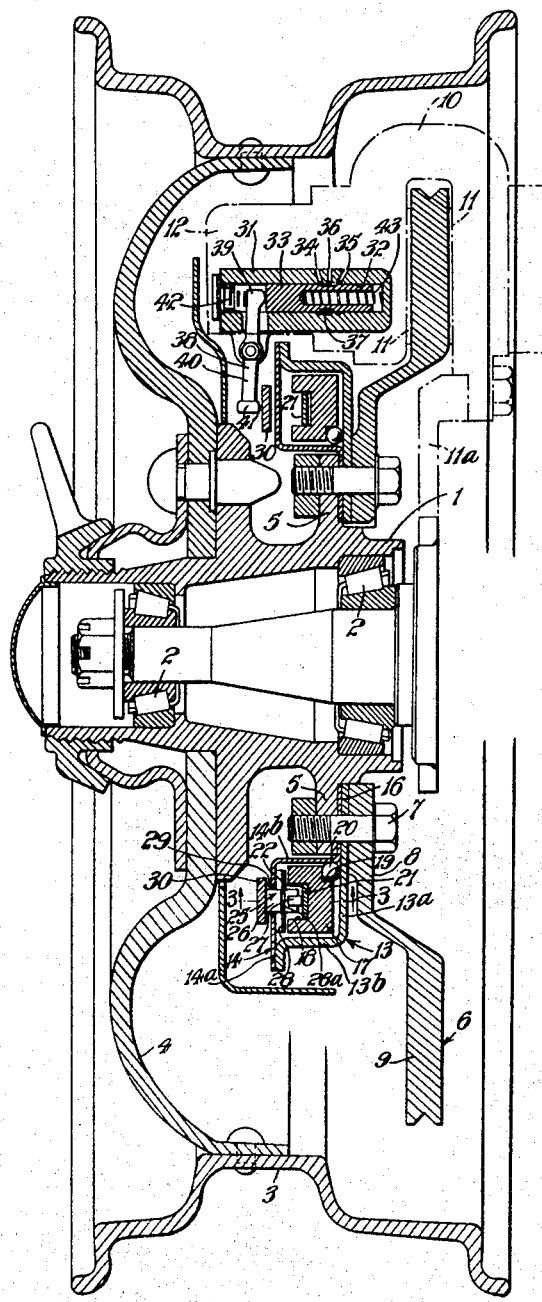

The invention will now be described with reference to the accompanying drawings, of which:

Figure 1 is a side elevation, partly in section, of the device of the present invention, an associated disc brake housing also being illustrated, Figure 2 is a section on the line 2—2 of Figure 1 and Figure 3 is a detailed section on the line 3—3 of Figure 2.

In this form of the invention as applied to a motor vehicle wheel equipped with a disc brake of the kind described and claimed in United States Patent No. 2,790,516, the wheel comprises an inner hub 1 rotatable on bearings 2 and a tyre-carrying rim 3 connected to the hub 1 by an annular dished web 4 located adjacent one side of the wheel. The hub 1 is provided, adjacent the end thereof remote from the web 4, with an annular radially-outwardly extending flange 5, and an annular brake disc 6 is secured at its inner periphery to said flange by circumferentially-spaced nuts and bolts 7. The disc 6 is dished as at 8 so that the outer peripheral portion 9, which provides the braking surfaces, is axially offset away from the web 4 of the wheel.

A caliper-type housing 10 is bolted to a torque member 11a secured to a non-rotatable part of the wheel assembly, the housing 10 straddling the outer periphery of the disc 6 and covering a minor portion only of the braking surfaces thereof. Pads 11 of friction material are axially slidable through passages in both limbs of the caliper 10 and are urged into frictional engagement with the braking surfaces of the disc by piston and cylinder mechanisms 12 secured to the limbs of the caliper 10. This is all in the known manner and is shown in the above-mentioned patent specification. As this mechanism forms no part of the present invention a more detailed description is not considered necessary.

Located in the annular space between the brake disc and the web 4 of the wheel is an annular drum-member which comprises two annular members 13, 14 each having a radially-extending side 13a and 14a, respectively, and an axially-extending side 13b and 14b, respectively, so shaped as together to define an annular closed channel of rectangular cross-section. The inner periphery 16 of said drum-member is secured to the wheel.

Located within said drum-member, and rotatable relative thereto, is a flywheel 17 of rectangular cross-section and having an annular recess 18 of rectangular cross-section located in the radially-extending face thereof remote from the disc 6. A groove 19 is provided on the inner periphery of the face of said flywheel 17 adjacent the disc 6, and a series of balls 20 are located therein to run on the adjacent sides of the drum-member and provide a low-friction bearing for the flywheel 17.

An annular radial ring cam 21 is located in the rectangular recess 18 in the flywheel 17 to rotate therewith, said cam 21 being provided with four circumferentially equi-spaced depressions 22 having sloping sides 23 of equal length, and a stop 24 is provided at the outer end of each sloping side 23. A cam-follower 25 is provided to co-operate with each of said depressions 22, said cam-follower 25 comprising a stem 26 bifurcated at one end to accommodate a roller 27 and a leaf-spring 28 secured to the drum-member and engaging in an annular groove 28a in each stem 26 to urge said rollers 27 into engagement with the cam 21.

The end of the stem 26 remote from the roller 27 extends through an aperture 29 in the drum-member on the side thereof remote from the disc 6, and secured to the ends of said four stems 26 is an annular radial ring member 30 which is co-axial with the wheel and drum-member and which rotates therewith.

Secured to or integral with one end of the non-rotatable brake housing 10 is a valve mechanism comprising a valve body 31 containing a bore 32 in which a slide valve 33 is axially slidable relative to the wheel assembly. Three conduits extend through the said body, the conduit 34, furthermost relative to the brake disc 6, being adapted to be connected to a source of hydraulic pressure, e.g. a master-cylinder of any known type, whilst the conduit 35 nearest the disc 6 is adapted to be connected to the hydraulic reservoir (not shown).

The intermediate conduit 36 is adapted to be connected to the brake-operating piston and cylinder mechanism 12. The slide-valve 33 is provided with an annular groove 37 adapted to connect the inlet conduit 34 with the brake conduit 36, or the brake conduit 36 with the exhaust conduit 35. A lever 38 pivoted to the housing 10 has one end 39 in contact with the end of the slide-valve 33 remote from the disc 6, the other end 40 of the lever 38 abutting the rotatable annular member 30 through a roller 41 rotatably secured to the end 40 of the lever. A helical compression spring 42 maintains the end 39 of the lever and the slide-valve 33 in abutting engagement, whilst a similar spring 43, acting on the slide-valve 33 in the opposite direction, maintains the roller 41 on the other end of the lever in contact with the annular member 30.

The arrangement of parts is such that the spring-loaded cam-followers 25 are normally located in the bottom of the depressions 22 in the annular cam 21 and the annular member 30 is in such an axial position relative to the housing 10 that the slide-valve 33, the axial movement of which is controlled by the lever 38, connects the inlet conduit 34 with the intermediate conduit 36 leading to the brakes.

On rotation of the wheel, as on starting the vehicle, the drum-member rotates with the wheel and, providing the acceleration is not excessive, the flywheel 17 rotates with the drum-member, relative angular movement being prevented by the four leaf springs 28 which force the cam-followers 25 into the depressions 22 in the cam-surface 21. If the acceleration is excessive, the flywheel 17, due to its greater mass and inertia, will lag behind the drum-member, the cam-followers 25 riding up one slope 23 of each depression 22 towards the stop 24 at the top thereof. During this relative angular movement between the drum-member and flywheel 17 the annular member 30, secured to the cam-followers 25, moves axially outwardly to angularly move the lever 39 which in turn may move the slide-valve 33 to a position in which the brake-operating cylinders 12 are connected to exhaust through the conduits 36 and 35. However, since the brakes are not normally applied during acceleration, this is no disadvantage. When the wheel is rotating at a substantially uniform velocity the spring-urged cam-followers 25 move the cam 21 and flywheel 17 back to the original relative position in which the followers 25 are positioned in the bottom of the depressions 22 and in this relative position of drum-member and flywheel 17 the slide-valve 33 is in such a position that the inlet connection 34 and the brake connection 36 are in communication.

The brake may thus be applied, and the braking pressure, flowing from the master-cylinder or other source, passes through the slide-valve 33 to the brake cylinders 12, where it forces the pads 11 of friction material axially against the braking surfaces of the disc 6. If the brake is applied so heavily that the wheel skids or slides on the supporting surface, the wheel momentarily checks and the drum-member decelerates with it. The flywheel 17, however, due to its greater mass and inertia, overruns the drum-member, the movement of the cam-followers 25 up the slopes 23 of the depressions 22 in the cam-surfaces 21 moving the annular member 30 axially outwardly away from the drum-member. This, acting through the lever 40, operates the slide-valve 33 to connect the brake conduit 36 to the exhaust conduit 35 and thus relieves the braking pressure to allow the wheel to rotate normally once more.

With the wheel rotating normally, the cam-followers 25 again centralize in the depressions 22 of the cam 21 and the slide-valve 33 is moved back so that the brake can once more be applied. This process is repeated extremely quickly so long as the locking tendency of the brake exists whilst it is being applied by the driver, and thus prevents the wheel from locking. However, the mean pressure flowing to the brakes is substantially equivalent to that which will brake the wheel most effectively without it skidding or sliding on the ground. The springs 28 associated with the four cam followers 25 are sufficiently strong to prevent the flywheel 17 from moving relative to the drum-member during normal acceleration or deceleration of the vehicle, and it is only on a sudden deceleration, as by a skidding or sliding wheel, that relative angular movement is obtained between the flywheel 17 and the drum-member to operate the valve mechanism 33 and momentarily restrict the braking pressure.

The invention may be used in conjunction with disc brakes of a type other than that herein described, and it may be used in conjunction with drum brakes. It is, however, particularly advantageous with disc brakes since it utilizes the space between the disc 6 and the web 4 of the wheel. It may be used with brakes other than motor vehicle brakes, e.g., rolling stock and aircraft.

Having now described my invention, what I claim is:

1. A brake control apparatus which comprises an annular housing to be rotated on its axis by a wheel to be braked, an annular inertia element within and concentric with said housing and having cam surfaces at symmetrically spaced intervals inclined in a direction axial to said inertia element, cam followers one at each of said intervals biased axially to said cam surfaces and extending through a radial wall of said housing, an annular plate outside said housing carried by said cam followers and rotatable with said housing, a lever having an arm bearing on said plate to be tilted by the axial movement of said plate and a valve actuated by said lever to admit pressure fluid to a brake supply conduit as said plate moves axially in one direction and to exhaust fluid from said conduit as said plate moves in the opposite direction.

2. The brake control apparatus of claim 1 in which the inertia element has a cam plate secured thereto, said cam plate having surfaces depressed toward said inertia element at symmetrically arranged positions about the axis of said inertia element.

3. The brake control apparatus of claim 2 in which said cam plate has portions bent away from said inertia element at the ends of said depressed portions to form stops for said cam follower.

4. The brake control apparatus of claim 1 having spring elements engaging said cam followers and bearing against the inner surface of a wall of said housing to press said cam followers into engagement with said cam surfaces.

5. A rotary inertia device for the control of fluid pressure brakes comprising an annular rotatable housing, an annular flywheel and cam assembly in said housing, concentrically thereof and rotatable as a unit relative to said housing, said cam having a cam surface normal to the axis of said assembly and housing, said cam surface having depressions spaced symmetrically about its axis and stops between said depressed cam surfaces to limit the rotation of said flywheel and cam relative to said housing, said depressions being of the same size and having sloping sides, cam followers movable axially of said cam and flywheel, one for each said depression, a spring pressing each said cam follower against said cam, a plate rotatable about the axis of said flywheel and operatively connected to said cam followers to be moved axially of said flywheel by said cam followers and a valve mechanism having an operative element actuated by said plate to control the flow of pressure fluid to said brakes.

6. A rotary inertia device for the control of fluid pressure brakes comprising an annular rotatable housing, an annular flywheel and cam assembly in said housing, concentrically thereof and rotatable as a unit relative to said housing, said cam having a cam surface normal to the axis of said assembly and housing, said cam surface having depressions spaced symmetrically about its axis, said depressions being of the same size and having sloping sides, cam followers movable axially of said cam and flywheel, one for each said depression, an individual leaf spring for each cam follower pressing its cam follower against said cam, a plate rotatable about the axis of said flywheel and operatively connected to said cam followers to be moved axially of said flywheel by said cam followers and a valve mechanism having an operative element actuated by said plate to control the flow of pressure fluid to said brakes.

References Cited in the file of this patent

UNITED STATES PATENTS

| | | |
|---|---|---|
| 2,290,589 | Steinmiller | July 21, 1942 |
| 2,295,725 | Eksergian | Sept. 15, 1942 |
| 2,796,482 | Inderau | June 18, 1957 |
| 2,818,244 | Ropar | Dec. 31, 1957 |

FOREIGN PATENTS

| | | |
|---|---|---|
| 382,241 | Great Britain | Oct. 20, 1932 |